Dec. 8, 1942.  L. M. MOTT-SMITH  2,304,191

GRAVITY METER

Filed May 19, 1939

INVENTOR.
Lewis M. Mott-Smith.
By J. Vincent Martin
and
Ralph R. Browning
ATTORNEYS Patented Dec. 8, 1942

2,304,191

UNITED STATES PATENT OFFICE 2,304,191

GRAVITY METER

Lewis M. Mott-Smith, Houston, Tex., assignor to Vincent J. Meyer

Application May 19, 1939, Serial No. 274,541

6 Claims. (Cl. 265—1.4)

This invention relates to gravity meters, and has for its general object to provide a highly accurate means for indicating deflections of a gravity meter due to changes in the force of gravity.

The principal means for reading or observing deflections of gravity meters in the past has been by direct observation of the position of a moving part of the gravity meter, usually through some system of lenses or the like. Such a means is of limited sensitivity and accuracy because there is a definite lower limit to the size of movement which can be optically detected and evaluated.

It is therefore an object of this invention to provide a means for indicating the deflections of a gravity meter which will not be dependent upon a direct observation of the movements of a part of the meter itself.

The particular means which has been devised for accomplishing this object is the provision of a means whereby deflections of a gravity meter are caused to produce variations in or deflections of a beam of light, and these variations or deflections detected by electrical or other suitable means.

A further object is to produce such a means in which the indications will be independent of any variations in the light source by which the beam of light is produced.

In the past also difficulty has been experienced with sensitive gravity meters because the movable parts are disturbed and caused to move almost continuously about their equilibrium position by ground vibration, wind, etc., and the true equilibrium position has for this reason been difficult to determine.

It is a still further object to produce an indicating means which will avoid indications of such undesired movements and indicate only the average or equilibrium position of the gravity meter.

Other objects and advantages will appear from the following description and the accompanying drawing, in which are set forth by way of illustration certain specific embodiments of this invention.

Figure 1:
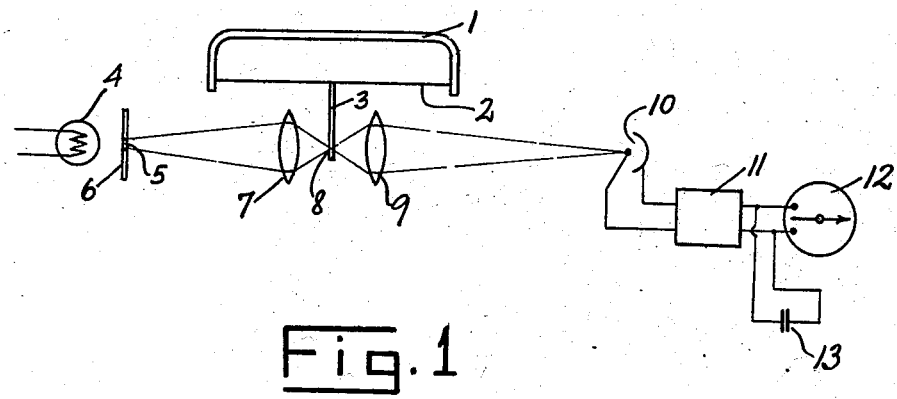
Fig. 1 is a diagrammatic plan view of a torsion gravity meter and a light beam and electrical means for indicating deflections of the meter.

Referring now to the drawing more in detail, there is shown in Fig. 1 a torsion gravity meter having a rigid frame 1, a torsion fibre 2, and a weight arm 3, which in this case acts as a vane or means for intercepting a light beam when the meter is deflected as by a change in the value of gravity.

The light beam in this instance is produced by any suitable light source such as an electric lamp 4, and is reduced in area by being caused to pass through a slit 5 in a mask 6. This light beam is then passed through a suitable condensing lens 7 which reduces it to a very small cross section area at the focal point 8 substantially opposite the weight arm 3. The beam then spreads and is passed through another lens 9 which focuses it onto a light sensitive device such as a photoelectric cell 10.

The terminals of the photoelectric cell 10 are connected, preferably through an amplifier 11 to an indicating microammeter 12 or similar instrument, which will thus serve to indicate the amount of light falling on the photoelectric cell 10. As the weight arm 3 of the gravity meter is deflected by changes in gravity, it will intercept more or less of the light beam at the focal point 8, and because of the very small area of the concentrated light beam at this point, minute movements of the arm 3 will cause relatively large changes in the intensity of the light striking the photoelectric cell 10. These will in turn be indicated on the meter 12. In order to damp out movement of the gravity meter due to earth vibrations, wind, etc., a condenser 13 or other low pass filter or the equivalent may be employed with the meter 12, whereby the meter will be caused to indicate the average or equilibrium intensity of the light beam and position of the weight arm.

Figure 2:
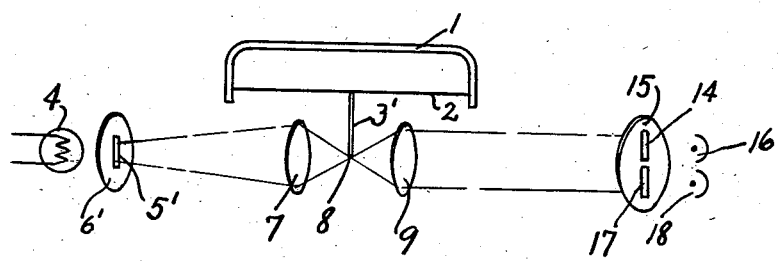
Fig. 2 is a diagrammatic plan view of a similar embodiment by which indications may be obtained which are independent of variations in intensity of the light source.

Referring now to Fig. 2, the arrangement is similar except that whereas the aperture 5' in the mask 6' is as in Fig. 1, in the form of a slit producing a ribbon of light, the weight arm 3' is positioned so as to intercept part of the beam only. This part of the beam is directed through a slit 14 in a mask 15 onto one photo-electric cell 16 while the other part of the beam which is not affected by movements of the weight arm is directed through a separate slit 17 in the mask 15 onto a second photoelectric cell 18. The effects of the light beams on these photoelectric cells are then balanced against each other in any suitable manner to eliminate the effect of any changes in intensity of the light source and determine the true amount of any change which is due to deflection of the gravity meter. One arrangement for accomplishing this is shown in Fig. 3.

Figure 3:
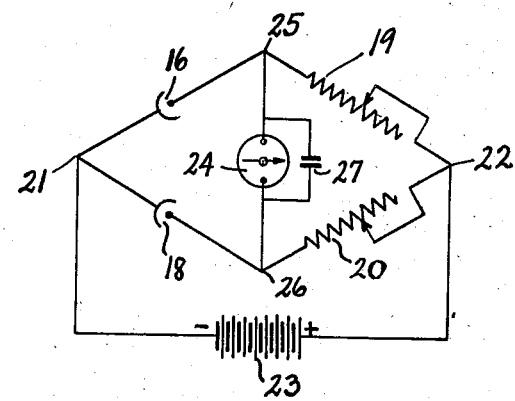
Fig. 3 is a diagrammatic view showing the electrical hook-up of the device shown in Fig. 2.

Fig. 3 shows the two cells 16 and 18 connected to each other in opposed relation in a bridge arrangement in series with a pair of variable resistances 19 and 20. Connected to this circuit with its poles attached at 21 between the photoelectric cells and at 22 between the resistances, respectively, is a battery 23. A galvanometer 24 is connected across the bridge to the points 25 and 26 between the respective cells and the resistances 19 and 20. A condenser 27 may be connected across the galvanometer for the purpose set forth in connection with Fig. 1.

In operation, it will be seen that both photocells will be affected alike by any variation in the light source. When the bridge of Fig. 3 is once balanced it will therefore stay balanced regardless of variation in light source. However, if the weight arm 3' is deflected, only the cell 16 will be affected and the bridge will be thrown out of balance. It may be again balanced by means of the variable resistances, and the amount by which the cell 16 was affected and hence the amount of deflection of the arm 3' may be determined by the amount of resistance change necessary to restore the balance of the bridge and cause the galvanometer to have a zero deflection. The condenser 27 will damp out minor variations due to earth vibrations, wind, etc., as explained in connection with Fig. 1 and will prevent these from materially affecting the galvanometer unless the equilibrium point actually changes due to a change in gravity.

Figure 4:
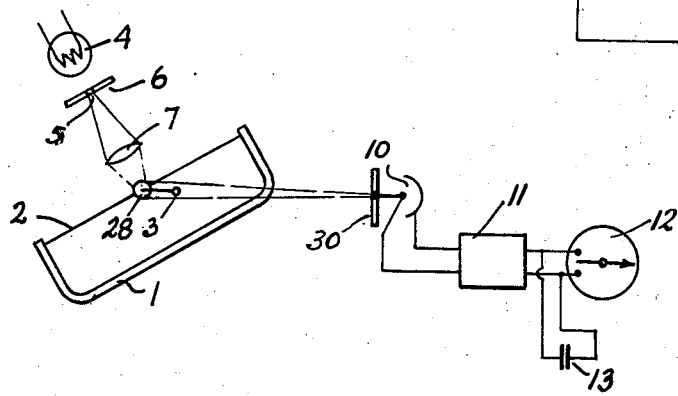
Fig. 4 is a perspective view showing a slight modification in which the light beam is deflected by deflections of the meter instead of being changed in intensity.

In Fig. 4 the arrangement is the same as in Fig. 1 except that the beam of light is projected onto a mirror surface 28 on the movable part of the meter and the reflected rays focused on a slit in a mask 30 so that when the meter is deflected the beam is deflected with respect to the slit and the amount of light falling on the photoelectric cell is varied.

It will be appreciated that while this invention has been illustrated in connection with torsion gravity meters, it is applicable as well to other types. It will also be appreciated that other light sensitive means than photoelectric cells may be employed and other arrangements used for detecting variations therein may be employed within the scope of this invention.

Having described my invention, I claim:

1. In combination, a gravity meter having a part movable according to variation in gravity, a single means for projecting a pair of light beams, means carried by said movable part for varying one of said light beams without disturbing the other as said part is moved, separate means for receiving said light beams, respectively, and means for balancing said receiving means against each other to eliminate the effect of variation in light source and to determine the variation due to movement of said part.

2. In combination, a gravity meter having a part movable according to variation in gravity, a single means for projecting a pair of light beams, means carried by said movable part for varying one of said light beams without affecting the other, a light sensitive means for receiving each of said light beams, means for balancing said light sensitive means against each other to eliminate the effect of variation in light source and to determine the variation of light in said one beam due to movement of said part.

3. In combination, a gravity meter having a part movable according to variation in gravity, a single means for projecting a pair of light beams, means carried by said movable part for varying one of said light beams as said part is moved, a photoelectric cell for receiving the light from each of said light beams, means for balancing said photoelectric cells against each other, and means for indicating the difference in effect of the two light beams on said photoelectric cells, respectively, to eliminate the effect of variation in light source and determine the variation in said one beam due to movement of said part.

4. In combination, a gravity meter having a part movable according to variation in gravity, a single means for projecting a pair of light beams, means carried by said movable part for varying one of said light beams as said part is moved, a light sensitive device for receiving the light from each of said light beams, means for electrically balancing said light sensitive devices against each other and indicating the difference in effect of said light beams thereon to eliminate the effect of variation in light source and to determine the variation in said one beam due to movement of said part.

5. In combination, a gravity meter having a part movable according to variation in gravity, a single means for projecting a pair of light beams, means carried by said movable part for varying one of said light beams as said part is moved, a photoelectric cell for receiving the light from each of said light beams, a bridge for balancing the currents from said photoelectric cells against each other, and means for indicating the variation in current produced by one of said cells compared with the other to eliminate the effect of variation in light source and to determine the variation due to movement of said part.

6. In combination, a gravity meter having a part movable according to variation in gravity, a single light source, separate means for receiving different portions of the light from said light source, means carried by said movable part of the gravity meter for varying that portion of the light falling on one of said light receiving means without disturbing the light falling on the other of said light receiving means, and means for balancing said light receiving means against each other to eliminate the effect of variation in light source and to detect the variation due to movement of said movable part of the gravity meter.

LEWIS M. MOTT-SMITH.